US012577394B2

(12) United States Patent
Wang et al.

(10) Patent No.: US 12,577,394 B2

(45) Date of Patent: Mar. 17, 2026

(54) FLAME RETARDANT COMPOSITIONS INCLUDING RECYCLED POLYCARBONATE AND POLYBUTYLENE TEREPHTHALATE BLENDS

(71) Applicant: SHPP GLOBAL TECHNOLOGIES B.V., Bergen op Zoom (NL)

(72) Inventors: Qin Wang, Shanghai (CN); Mingcheng Guo, Shanghai (CN); Jian Yang, Shanghai (CN)

(73) Assignee: SHPP Global Technologies B.V., Bergen op Zoom (NL)

(*) Notice: Subject to any disclaimer, the term of this patent is extended or adjusted under 35 U.S.C. 154(b) by 526 days.

(21) Appl. No.: 18/017,194

(22) PCT Filed: Jul. 22, 2021

(86) PCT No.: PCT/IB2021/056643

§ 371 (c)(1),
(2) Date: Jan. 20, 2023

(87) PCT Pub. No.: WO2022/018683

PCT Pub. Date: Jan. 27, 2022

(65) Prior Publication Data

US 2023/0295422 A1 Sep. 21, 2023

(30) Foreign Application Priority Data

Jul. 24, 2020 (EP) .................................... 20187589

(51) Int. Cl.
*C08L 69/00* (2006.01)

(52) U.S. Cl.
CPC ......... *C08L 69/00* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | | |
|---|---|---|---|---|
| 8,841,367 | B2 | 9/2014 | Zheng et al. | |
| 2012/0129990 | A1 | 5/2012 | Kikuchi et al. | |
| 2013/0313493 | A1 * | 11/2013 | Wen | C08L 69/005 252/601 |
| 2013/0317142 | A1 | 11/2013 | Chen et al. | |
| 2013/0317150 | A1 | 11/2013 | Wan et al. | |
| 2017/0247539 | A1 | 8/2017 | Chen et al. | |

FOREIGN PATENT DOCUMENTS

| | | | | |
|---|---|---|---|---|
| CN | 106536625 | * | 3/2017 | |
| EP | 0531008 | A1 | 3/1993 | |
| EP | 3553132 | A1 | 10/2019 | |
| EP | 3683271 | A1 | 7/2020 | |
| WO | 2007/102272 | A1 | 9/2007 | |
| WO | 2020/075095 | A1 | 4/2020 | |
| WO | WO-2020079565 | A1 * | 4/2020 | C08J 5/046 |
| WO | 2021/064579 | A1 | 4/2021 | |

OTHER PUBLICATIONS

CN_106536625_A_I_Eng_Trans (Year: 2017).*
International Search Report and Written Opinion mailed Sep. 24, 2021 in PCT/IB2021/056643 (13 pgs.).

* cited by examiner

*Primary Examiner* — Jeffrey D Washville
(74) *Attorney, Agent, or Firm* — Quicker Law, LLC

(57) ABSTRACT

Thermoplastic compositions include: (a) from about 10 wt % to about 65 wt % of at least one virgin polycarbonate; (b) from about 10 wt % to about 40 wt % of a polybutylene terephthalate (PBT) component derived from a post-consumer recycled (PCR) polymer; (c) from about 25 wt % to about 65 wt % of at least one PCR polycarbonate; (d) from about 10 wt % to about 40 wt % of a polycarbonate-siloxane (PC-Si) copolymer; (e) from 0.1 wt % to about 10 wt % of a phosphazene flame retardant; and (f) from 0.1 wt % to about 2 wt % of a silicone oil.

15 Claims, No Drawings

FLAME RETARDANT COMPOSITIONS INCLUDING RECYCLED POLYCARBONATE AND POLYBUTYLENE TEREPHTHALATE BLENDS

CROSS-REFERENCE TO RELATED APPLICATION

This application is the National Stage of International Application No. PCT/IB2021/056643 filed Jul. 22, 2021, which claims priority to and the benefit of European Application No. 20187589.5 filed Jul. 24, 2020, the disclosures of which are incorporated herein by this reference in their entireties.

FIELD OF THE DISCLOSURE

The present disclosure relates to thermoplastic compositions including at least two resins derived from post-consumer recycled (PCR) polymers that have improved impact and flame retardance properties.

BACKGROUND OF THE DISCLOSURE

Thermoplastic compositions including polycarbonate and polyester blends are popular in the consumer electronics market because they can provide a balance of impact, chemical resistance and flowability properties. Polycarbonate copolymers may be added to further enhance chemical resistance and improve ductility of the compositions. Flame retardant additives may also be incorporated to improve flame resistance for consumer electronics applications. Unfortunately, these additional additives, and in particular flame retardant additives, have been found to have a detrimental impact on certain properties such as impact strength and heat distortion temperature (HDT). It is a challenge to identify compositions that have a good balance of all of these properties.

In addition, it is increasingly important for consumer electronics products to be formed of more sustainable or "greener" materials to reduce the impact of these materials on the environment. One way to reduce the footprint of thermoplastic compositions for use in such applications is to use post-consumer recycled (PCR) polymers as a raw material of the thermoplastic compounds in the composition. For example, polybutylene terephthalate (PBT) may be made from post-consumer recycled polyethylene terephthalate (PET). An example of such PBT plastics are available from SABIC, and are referred to as "iQ PBT" resin. Further, PCR-polycarbonate (PC) is available for use in such compositions. Unfortunately, PCR resins such as iQ PBT and PCR-PC have limitations which make it even more challenging to identify compositions that have a good balance of properties such as flame resistance/retardance, impact and thermal properties.

These and other shortcomings are addressed by aspects of the present disclosure.

SUMMARY

Aspects of the disclosure relate to thermoplastic compositions including: (a) from about 10 wt % to about 65 wt % of at least one virgin polycarbonate; (b) from about 10 wt % to about 40 wt % of a polybutylene terephthalate (PBT) component derived from a post-consumer recycled (PCR) polymer; (c) from about 25 wt % to about 65 wt % of at least one PCR polycarbonate; (d) from about 10 wt % to about 40 wt % of a polycarbonate-siloxane (PC-Si) copolymer; (e) from 0.1 wt % to about 10 wt % of a phosphazene flame retardant; and (f) from 0.1 wt % to about 2 wt % of a silicone oil.

Aspects of the disclosure further relate to articles including the thermoplastic composition, including a component of a consumer electronics product.

DETAILED DESCRIPTION

The present disclosure relates to thermoplastic compositions of impact modified flame-retardant PC/PBT compounds that include iQ PBT formed from PCR-PET. The compositions offer a balance of good chemical resistance, flame retardance and impact properties and which also satisfy market expectations regarding sustainability.

The present disclosure can be understood more readily by reference to the following detailed description of the disclosure and the Examples included therein. In various aspects, the present disclosure pertains to thermoplastic compositions including: (a) from about 10 wt % to about 65 wt % of at least one virgin polycarbonate; (b) from about 10 wt % to about 40 wt % of a polybutylene terephthalate (PBT) component derived from a post-consumer recycled (PCR) polymer; (c) from about 25 wt % to about 65 wt % of at least one PCR polycarbonate; (d) from about 10 wt % to about 40 wt % of a polycarbonate-siloxane (PC-Si) copolymer; (e) from 0.1 wt % to about 10 wt % of a phosphazene flame retardant; and (f) from 0.1 wt % to about 2 wt % of a silicone oil.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a silicone oil" includes mixtures of two or more silicone oils.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

The terms "BisA," "BPA," or "bisphenol A," which can be used interchangeably, as used herein refers to a compound having a structure represented by the formula:

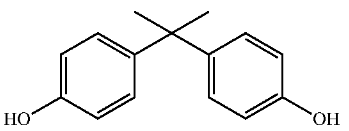 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS # 80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to thermoplastic compositions including: (a) from about 10 wt % to about 65 wt % of at least one virgin polycarbonate; (b) from about 10 wt % to about 40 wt % of a polybutylene terephthalate (PBT) component derived from a post-consumer recycled (PCR) polymer; (c) from about 25 wt % to about 65 wt % of at least one PCR polycarbonate; (d) from about 10 wt % to about 40 wt % of a polycarbonate-siloxane (PC-Si) copolymer; (e) from 0.1 wt % to about 10 wt % of a phosphazene flame retardant; and (f) from 0.1 wt % to about 2 wt % of a silicone oil.

As used herein, virgin polycarbonate is a polycarbonate derived from petrochemical sources; virgin polycarbonate does not include recycled polycarbonate content. The polycarbonate may include polycarbonate copolymers.

The polybutylene terephthalate (PBT) component is derived from a PCR polymer. In some aspects the PBT component is derived from PCR polyethylene terephthalate (PET). The PBT component derived from the PCR polymer (such as PCR PET) may be formed according to conventional methods, and may include iQ PBT plastics available from SABIC. In certain aspects the composition includes from about 10 wt % to about 20 wt % of a PBT component derived from a PCR polymer. The PBT component may include PBT copolymers.

The compositions also include from about 25 wt % to about 65 wt % of at least one PCR polycarbonate. The PCR polycarbonate can be formed according to conventional methods, and may include PCR-PC available from SABIC. The PCR-PC component may include copolymers including PCR-PC. A recycled (e.g., PCR) polycarbonate can be distinguished from a virgin polycarbonate by the inclusion of at least 10 mol % —OH endgroup content in the polycarbonate. In some aspects the PCR polycarbonate includes from 10 mol % to about 35 mol % —OH endgroup content in the polycarbonate. The —OH endgroup content of the PCR PC may be determined according to conventional methods known to those skilled in the art. The recycled PC may be clear or colored. Clear recycled PC may be sourced from, for example, water bottles, recycled PC sheets, automobile headlights, and optical discs (e.g., one or more of compact discs (CDs), digital versatile discs (DVDs) and Blue-ray discs). One exemplary source for colored PC is water bottles.

The PC-Si copolymer may include, but is not limited to, PC-Si copolymers having a siloxane content of from about 5 wt % to about 45 wt %. In further aspects the PC-Si copolymer has a siloxane content of from about 15 wt % to about 25 wt %, or a siloxane content of about 20 wt %. Exemplary PC-Si copolymers include SABIC EXL copolymers.

The phosphazene used in the flame retardant composition is an organic compound having a —P═N— bond in the molecule. In an embodiment, the phosphazene is a cyclic phenoxyphosphazene represented by the following formula:

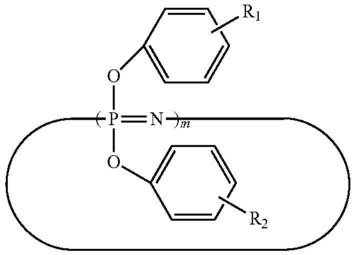

In the formula m represents an integer of 3 to 25, P represents a phenyl group, $R_1$ and $R_2$ are the same or different and are independently a hydrogen, a hydroxyl, a $C_{1-12}$alkoxy, or a $C_{1-12}$ alkyl. In some aspects m is an integer from 2 to 10, or in particular aspects an integer from 3 to 8.

The composition includes from 0.1 wt % to about 2 wt % of a silicone oil. An exemplary silicone oil is SFR100, available from Momentive Performance Materials.

In certain aspects the composition further includes from greater than 0 wt % to about 2 wt % of an anti-drip agent. A purely exemplary anti-drip agent is styrene acrylonitrile (SAN)-encapsulated polytetrafluoroethylene (PTFE).

In particular aspects the composition includes from greater than 0 wt % to about 2 wt % of an epoxy impact modifier. The epoxy impact modifier may include, but is not limited to, a terpolymer including ethylene, acrylic ester and glycidyl methacrylate. In other aspects the composition includes from greater than 0 wt % to about 5 wt % of at least one stabilizer. The at least one stabilizer may include, but is not limited to, a UV stabilizer, a zinc phosphate stabilizer, or a combination thereof.

Properties of Thermoplastic Compositions

Thermoplastic compositions according to aspects of the disclosure have improved properties as compared to comparative/reference compositions that do not include the phosphazene flame retardant or the silicone oil. Specifically, in some aspects the composition has an improved notched Izod impact strength, as determined in accordance with ASTM D256 and ASTM D4812, as compared to a comparative composition that does not include the phosphazene flame retardant. In certain aspects the notched Izod impact strength is at least 50% improved, or at least 75% improved or at least 100% improved, or at least 150% improved, or at least 200% improved, or at least 250% improved, or at least 500% improved, or at least 600% improved, or at least 700% improved, or at least 800% improved, or up to 1500% improved, or from 50-1500% improved, or from 75-1500% improved, as compared to a comparative composition that does not include the phosphazene flame retardant. The comparative composition described in aspects of the disclosure may include bisphenol-A bis(diphenyl phosphate) (BPADP) instead of the phosphazene flame retardant. BPADP has the following chemical formula:

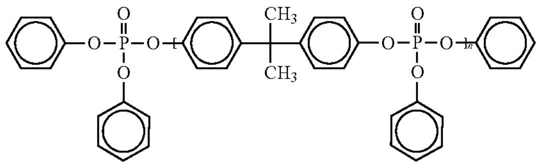

In further aspects the composition has an improved notched Izod impact strength at 0° C. or −10° C. (low temperature), as determined in accordance with ASTM D256 and ASTM D4812, as compared to a comparative composition that does not include the phosphazene flame retardant. In particular aspects the low temperature notched Izod impact strength of the composition is at least 50% improved, or at least 100% improved, or at least 250% improved, or at least 500% improved, or at least 600% improved, or at least 700% improved, or at least 1000% improved, or up to 1500% improved, or from 50-1500% improved, or from 100-1500% improved, or from 250-1500% improved, or from 500-1500% improved, as compared to a comparative composition that does not include the phosphazene flame retardant.

In some aspects the composition has an improved heat distortion temperature (HDT), as determined in accordance with ASTM D648, as compared to a comparative composition that does not include the phosphazene flame retardant. In further aspects the HDT is improved by at least 10%, or at least 12%, or at least 14%, or at least 16%, or at least 18%, or at least 20%, or at least 25%, or up to 50%, or from 10-50%, or from 12-50%, compared to a comparative composition that does not include the phosphazene flame retardant.

In particular aspects the composition has an improved flame retardance, as determined in accordance with UL94, as compared to a comparative composition that does not include the phosphazene flame retardant. In specific aspects the flame retardance (V1 or V2 combustion time in seconds) is reduced by at least 8%, or by at least 10%, or by at least 15%, or by at least 20%, or by at least 30%, or by at least 40%, or up to 50%, or from 8-50%, or from 10-50%, as compared to a comparative composition that does not include the phosphazene flame retardant. In further aspects the composition has a flame retardancy of V0 at a thickness of 1.5 millimeters (mm) or lower, or at a thickness of 3.0 mm or lower, when determined in accordance with UL94.0

In some aspects the composition has an improved flame retardance, as determined in accordance with UL94, as compared to a comparative composition that does not include the silicone oil. In further aspects the flame retardance (V1 or V2 combustion time in seconds) is reduced by at least 20%, or by at least 25%, or by at least 30%, or by at least 35%, or by at least 50%, or up to 100%, or from 20-100%, or from 20-50%, as compared to a comparative composition that does not include the silicone oil.

In some aspects the thermoplastic composition has (1) a flame retardance of V0 at a thickness of at least 1.5 mm when determined in accordance with UL94, and (2) a notched Izod impact strength of at least 690 Joules per meter (J/m) and 100% ductility at a temperature of −10° C. or lower, as determined in accordance with ASTM D256. In further aspects the composition has (1) a flame retardance of V0 at a thickness of at least 1.5 mm, and (2) a heat distortion temperature of at least 85° C. as determined in accordance with ASTM D648 at 1.82 megapascals (MPa) for samples having a thickness of 3.2 mm.

Methods of Manufacture

The one or any foregoing components described herein may be first dry blended with each other, or dry blended with any combination of foregoing components, then fed into an extruder from one or multi-feeders, or separately fed into an extruder from one or multi-feeders. Fillers used in the compositions, if included, may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded.

In particular aspects the article is a component of a consumer electronics product.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of:

(a) from about 10 wt % to about 65 wt % of at least one virgin polycarbonate;

(b) from about 10 wt % to about 40 wt % of a polybutylene terephthalate (PBT) component derived from a post-consumer recycled (PCR) polymer;

(c) from about 25 wt % to about 65 wt % of at least one PCR polycarbonate;

(d) from about 10 wt % to about 40 wt % of a polycarbonate-siloxane (PC-Si) copolymer;

(e) from 0.1 wt % to about 10 wt % of a phosphazene flame retardant; and (f) from 0.1 wt % to about 2 wt % of a silicone oil, wherein the combined weight percent value of all components does not exceed 100 wt %, and all weight percent values are based on the total weight of the composite.

Aspect 2. The thermoplastic composition according to Aspect 1, wherein the PBT component is derived from PCR polyethylene terephthalate (PET).

Aspect 3. The thermoplastic composition according to Aspect 1 or 2, wherein the PC-Si copolymer has a siloxane content of from about 5 wt % to about 45 wt %.

Aspect 4. The thermoplastic composition according to any of Aspects 1 to 3, wherein the PC-Si copolymer has a siloxane content of from about 15 wt % to about 25 wt %.

Aspect 5. The thermoplastic composition according to any of Aspects 1 to 4, wherein the PC-Si copolymer has a siloxane content of about 20 wt %.

Aspect 6. The thermoplastic composition according to any of Aspects 1 to 5, wherein the silicone oil comprises silicone.

Aspect 7. The thermoplastic composition according to any of Aspects 1 to 6, wherein the phosphazene is a cyclic phenoxyphosphazene represented by the formula:

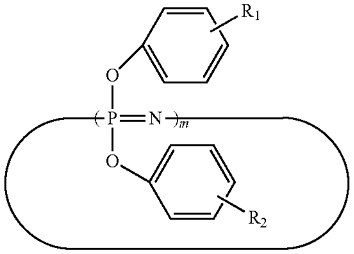

, wherein m represents an integer of 3 to 25, P represents a phenyl group, $R_1$ and $R_2$ are the same or different and are independently a hydrogen, a hydroxyl, a $C_{1-12}$ alkoxy, or a $C_{1-12}$ alkyl.

Aspect 8. The thermoplastic composition according to any of Aspects 1 to 7, wherein the composition further comprises from greater than 0 wt % to about 2 wt % of an anti-drip agent.

Aspect 9. The thermoplastic composition according to Aspect 8, wherein the anti-drip agent comprises styrene acrylonitrile (SAN)-encapsulated polytetrafluoroethylene (PTFE).

Aspect 10. The thermoplastic composition according to any of Aspects 1 to 9, wherein the composition further comprises from greater than 0 wt % to about 2 wt % of an epoxy impact modifier.

Aspect 11. The thermoplastic composition according to Aspect 10, wherein the epoxy impact modifier comprises a terpolymer comprising ethylene, acrylic ester and glycidyl methacrylate.

Aspect 12. The thermoplastic composition according to any of Aspects 1 to 11, wherein the composition further comprises from greater than 0 wt % to about 5 wt % of at least one stabilizer.

Aspect 13. The thermoplastic composition according to Aspect 12, wherein the at least one stabilizer comprises a UV stabilizer, a zinc phosphate stabilizer, or a combination thereof Aspect 14. The thermoplastic composition according to any of Aspects 1 to 13, wherein the composition has an improved notched Izod impact strength, as determined in accordance with ASTM D256 and ASTM D4812, as compared to a comparative composition that does not include the phosphazene flame retardant.

Aspect 15. The thermoplastic composition according to any of Aspects 1 to 14, wherein the composition has an improved notched Izod impact strength at 0° C. or −10° C., as determined in accordance with ASTM D256 and ASTM D4812, as compared to a comparative composition that does not include the phosphazene flame retardant.

Aspect 16. The thermoplastic composition according to any of Aspects 1 to 15, wherein the composition has an improved heat distortion temperature (HDT), as determined in accordance with ASTM D648, as compared to a comparative composition that does not include the phosphazene flame retardant.

Aspect 17. The thermoplastic composition according to any of Aspects 1 to 16, wherein the composition has an improved flame retardance, as determined in accordance with UL94, as compared to a comparative composition that does not include the phosphazene flame retardant.

Aspect 18. The thermoplastic composition according to any of Aspects 1 to 17, wherein the composition has an improved flame retardance, as determined in accordance with UL94, as compared to a comparative composition that does not include the silicone oil.

Aspect 19. An article comprising the composition according to any of Aspects 1 to 18.

Aspect 20. The article according to Aspect 19, wherein the article is a component of a consumer electronics product.

Aspect 21. A thermoplastic composition comprising:

(a) from about 10 wt % to about 65 wt % of at least one virgin polycarbonate;

(b) from about 10 wt % to about 40 wt % of a polybutylene terephthalate (PBT) component derived from a post-consumer recycled (PCR) polymer;

(c) from about 25 wt % to about 65 wt % of at least one PCR polycarbonate;

(d) from about 10 wt % to about 40 wt % of a polycarbonate-siloxane (PC-Si) copolymer;

(e) from 0.1 wt % to about 10 wt % of a phosphazene flame retardant; and (f) from 0.1 wt % to about 2 wt % of a silicone oil.

wherein the combined weight percent value of all components does not exceed 100 wt %, and all weight percent values are based on the total weight of the composite.

Aspect 22. The thermoplastic composition according to Aspect 21, wherein the PBT component is derived from PCR polyethylene terephthalate (PET).

Aspect 23. The thermoplastic composition according to Aspect 21 or 22, wherein the PC-Si copolymer has a siloxane content of from about 5 wt % to about 45 wt %.

Aspect 24. The thermoplastic composition according to any of Aspects 21 to 23, wherein the PC-Si copolymer has a siloxane content of from about 15 wt % to about 25 wt %.

Aspect 25. The thermoplastic composition according to any of Aspects 21 to 24, wherein the PC-Si copolymer has a siloxane content of about 20 wt %.

Aspect 26. The thermoplastic composition according to any of Aspects 21 to 25, wherein the composition further comprises from greater than 0 wt % to about 2 wt % of an anti-drip agent, wherein the anti-drip agent comprises styrene acrylonitrile (SAN)-encapsulated polytetrafluoroethylene (PTFE).

Aspect 27. The thermoplastic composition according to any of Aspects 21 to 26, wherein the composition further comprises from greater than 0 wt % to about 2 wt % of an epoxy impact modifier.

Aspect 28. The thermoplastic composition according to Aspect 27, wherein the epoxy impact modifier comprises a terpolymer comprising ethylene, acrylic ester and glycidyl methacrylate.

Aspect 29. The thermoplastic composition according to any of Aspects 21 to 28, wherein the composition further comprises from greater than 0 wt % to about 5 wt % of at least one stabilizer, wherein the at least one stabilizer comprises a UV stabilizer, a zinc phosphate stabilizer, or a combination thereof Aspect 30. The thermoplastic composition according to any of Aspects 21 to 29, wherein the at least one PCR polycarbonate comprises at least 10 mol % —OH endgroup content.

Aspect 31. The thermoplastic composition according to Aspect 30, wherein the at least one PCR polycarbonate comprises from 10 mol % to about 35 mol % —OH endgroup content.

Aspect 32. The thermoplastic composition according to any of Aspects 21 to 31, wherein the composition has a flame retardance of V0 at a thickness of 1.5 mm or lower when determined in accordance with UL94.

Aspect 33. The thermoplastic composition according to any of Aspects 21 to 32, wherein the composition has (1) a flame retardance of V0 at a thickness of at least 1.5 mm when determined in accordance with UL94, and (2) a notched Izod impact strength of at least 690 J/m and 100% ductility at a temperature of −10° C. or lower, as determined in accordance with ASTM D256.

Aspect 34. The thermoplastic composition according to any of Aspects 21 to 33, wherein the composition has (1) a flame retardance of V0 at a thickness of at least 1.5 mm, and (2) a heat distortion temperature of at least 85° C. as determined in accordance with ASTM D648 at 1.82 MPa for samples having a thickness of 3.2 mm.

Aspect 35. An article comprising the composition according to any of Aspects 21 to 34, wherein the article is a component of a consumer electronics product.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The materials used in the comparative and example compositions described herein are listed in Table 1:

TABLE 1

Materials

| Item Description | Chemical Description | Source |
|---|---|---|
| 100 GRADE PCP | PC | SABIC |
| PCP1300 | PC | SABIC |
| iQ PBT, High Viscosity | PBT | SABIC |
| PC-Siloxane copolymer, 20% siloxane content, PCP-endcapped | PC Copolymer | SABIC |
| Irganox ® 1010 | Antioxidant | BASF |
| 2-(2'Hydroxy-5-T-Octylephenyl)-Benzotriazole | UV stabilizer | Jingwei |
| Bisphenol A bis(diphenyl phosphate) (BPADP) | Flame retardant | Daihachi |
| SAN-encapsulated PTFE (intermediate resin) | Flame retardant | SABIC |
| Fushimi FP-110 (PPZ) | Flame retardant | Fushimi |
| Mono zinc phosphate (MZP) | Stabilizer | Budenheim |
| Lotader ® AX8900 | Impact modifier | Arkema |
| Recycled PC (PCR) | PC | SABIC |

Pellets were compounded from the compositions according to conventional processes. The resin and all additives except BPADP were pre-mixed and fed via the main throat; the BPADP (when included) was fed downstream in the extruder. The compositions were compounded using an output of 40 kilograms per hour (kg/hr), a screw speed of 350 revolutions per minute (RPM), a vacuum of 0.08 megapascals (MPa), a torque of from 50-65%, a barrel temperature of from 250-255° C. and a die head temperature of 255° C.

The pellets were injected molded according to the conditions set forth in Table 2:

TABLE 2

Injection Molding Parameters

| Molding parameters | Unit | PBT-based Compositions |
|---|---|---|
| Pre-drying time | hr | 4 |
| Pre-drying temp | ° C. | 90 |
| Hopper temp | ° C. | 70 |
| Zone 1 temp | ° C. | 220 |
| Zone 2 temp | ° C. | 220 |
| Zone 3 temp | ° C. | 245 |
| Nozzle temp | ° C. | 245 |
| Mold temp | ° C. | 60 |

Tensile properties were measured using ASTM D638 method, under a test speed of 5 millimeters/minute (mm/min). Impact strength was evaluated according to ASTM D256 and ASTM D4812, at room temperature, with a Pendulum Energy (PE) of 5 pound-force per foot (lbf/ft). Flexural properties were measured using method ASTM 790, under a test speed of 1.27 millimeters per minute (mm/min) with a part thickness of 3.2 mm. Density was measured using the immersion method for solid plastics part according to ASTM D792. Melt Volume Rate (MVR) was measured using granulate samples dried for 4 hrs at 90 degrees Celsius (° C.), according to ASTM D1238. Heat distortion temperature (HDT) was measured using method ASTM D648, under a stress of 1.82 MPa or 0.45 MPa, and a part thickness of 3.2 mm. Water absorption of plastics was tested using GEP method by dipping a part in water at room temperature for 48 hrs.

Table 3 lists comparative and example compositions that were formed to evaluate the effect of replacing virgin PBT (C1) with recycled PBT (iQ PBT). Different FR components were also evaluated (PPZ and BPADP). All values provided in this table and the other tables listing the compositions and their components are provided in weight percent (wt %):

TABLE 3

Comparative and Example Compositions

| Item Description | C1 | Ex1 | Ex2 | Ex3 |
|---|---|---|---|---|
| 100 GRADE PCP | 44.63 | 44.63 | 43.78 | 47.78 |
| PBT 315 | 20 | | | |
| iQ PBT, High Viscosity | | 20 | 20 | 20 |
| PC-Siloxane copolymer, 20% siloxane content | 25 | 25 | 25 | 25 |
| Lotader ® AX8900 | | | 1 | |
| PPZ | | | | 5.5 |
| MZP | 0.15 | 0.15 | | |
| BPADP | 8.5 | 8.5 | 8.5 | |
| Irganox ® 1010 | 0.15 | 0.15 | 0.15 | 0.15 |
| SAN-encapsulated PTFE | 0.8 | 0.8 | 0.8 | 0.8 |
| 2-(2'Hydroxy-5-T-Octylephenyl)-Benzotriazole | 0.27 | 0.27 | 0.27 | 0.27 |
| Pigment carbon black, medium color powder | 0.5 | 0.5 | 0.5 | 0.5 |
| Total (wt %): | 100 | 100 | 100 | 100 |

Various properties of the compositions of Table 3 were evaluated; results are provided in Table 4:

TABLE 4

Properties of Table 3 Compositions

| Property | Unit | C1 | Ex1 | Ex2 | Ex3 |
|---|---|---|---|---|---|
| MFR, 265° C., 5 kg, 300 s | g/10 min | 24 | 25 | 36.3 | 39.6 |
| HDT, 1.82 MPa, 3.2 mm | ° C. | 78 | 77 | 74 | 83 |
| Notched Izod impact strength, 23 ° C. (average 5 trials) | J/m | 458 | 320 | 590 | 960 |
| Izod, ductility, 23° C. (average 5 trials) | % | 88 | 60 | 100 | 100 |
| Flexural modulus | MPa | | 2410 | 2350 | 2330 |
| Flexural strength at yield | MPa | | 92.2 | 89.2 | 88.7 |
| Flexural strength at break | MPa | | 90.4 | 89.7 | 86.9 |
| FR, V1 at 1.1 mm, FOT 5 (t1 + t2) | s | | 102 | 66 | 42 |
| FR, V0 at 1.5 mm, FOT 5 (t1 + t2) | s | | 42 | 20 | 19 |

From the results in Table 4, by comparing C1 and Ex1 it is observed that replacing virgin PBT with iQ PBT, notched impact strength was reduced and average ductility was reduced from 88% to 60%. The results indicate that compositions including recycled resin components are more sensitive to notch impact strength than those including virgin resin.

To address this issue, potential solutions were evaluated, including the use of epoxy-based impact modifiers and/or more neutral FR additives (e.g., phosphazene). These compositions are evaluated in Ex2 and Ex3. Ex2 included 1% Lotader® AX8900, which includes an epoxy function group, as an impact modifier. As observed, the impact strength was slightly increased without adversely affecting FR performance. Other properties were comparable. Ex3 included PPZ as an FR additive; it was found that Izod impact strength was highly increased—by more than 50% as compared to Ex1. After aging 1 month at room temperature, the Izod impact strength of the Ex1 composition dropped 12%, while that of Ex3 was unchanged. Overall, the impact performance (both notched Izod impact strength and aging stability) if the composition including PPZ was significantly improved. At the same time, the thermal property (HDT) of the Ex3 composition was also improved; the HDT at 1.82 MPa of the Ex3 composition was about 5° C. higher than that of the Ex1 composition. Further, the FR robustness of Ex3 was also improved with a shorter burning time.

To further study the compositions, PCR-PC was included in the compositions shown in Table 5. Comparative composition C2 includes PC and iQ PBT with BPADP as an FR component; the formulation is similar to that of Ex1. Ex4 includes PC and iQ PBT with PPZ as an FR component; the formulation is similar to that of Ex3 but with lower PPZ loading. Ex5 includes 2 types of recycled resin—iQ PBT and PCR-PC. Ex6 is a PPZ-based formulation with 2 types of recycled resin (iQ PBT) and PCR-PC.

TABLE 5

Comparative and Example Compositions

| Item Description | C2 | Ex4 | Ex5 | Ex6 |
|---|---|---|---|---|
| 100 GRADE PCP | 45.23 | 48.73 | 2.23 | 5.73 |
| iQ PBT, High Viscosity | 20 | 20 | 20 | 20 |
| PC-Siloxane copolymer, 20% siloxane content | 25 | 25 | 25 | 25 |
| PCR-PC | | | 43 | 43 |
| PPZ | | 5 | | 5 |
| BPADP | 8.5 | | 8.5 | |
| Irganox ® 1010 | 0.15 | 0.15 | 0.15 | 0.15 |
| SAN-encapsulated PTFE | 0.8 | 0.8 | 0.8 | 0.8 |
| 2-(2'Hydroxy-5-T-Octylephenyl)-Benzotriazole | 0.27 | 0.27 | 0.27 | 0.27 |
| MZP | 0.05 | 0.05 | 0.05 | 0.05 |
| Total (wt %): | 100 | 100 | 100 | 100 |

The properties of the compositions of Table 5 are provided in Table 6:

TABLE 6

Properties of Table 5 Compositions

| Property | Unit | C2 | Ex4 | Ex5 | Ex6 |
|---|---|---|---|---|---|
| MFR at 265° C., 5 kg, 300 s | g/10 min | 27 | 19 | 42 | 25 |
| HDT, 0.45 MPa, 3.2 mm | ° C. | 89 | 105 | 86 | 102 |
| HDT, 1.82 MPa, 3.2 mm | ° C. | 77 | 91 | 75 | 88 |
| Notched Izod impact strength, 23° C., average | J/m | 452 | 845 | 86 | 843 |
| Notched Izod impact strength, 0° C., average | J/m | 101 | 738 | 78.5 | 727 |

TABLE 6-continued

| Properties of Table 5 Compositions | | | | | |
|---|---|---|---|---|---|
| Property | Unit | C2 | Ex4 | Ex5 | Ex6 |
| Notched Izod impact strength, −10° C., average | J/m | 98.4 | 710 | 81.5 | 691 |
| Notched Izod impact strength, −20° C., average | J/m | 95.8 | 188 | 81.2 | 154 |
| Flexural modulus | MPa | 2440 | 2260 | 2400 | 2270 |
| Flexural strength at yield | MPa | 94 | 89 | 94 | 89 |
| VX at 1.1 mm, UL94 | | V1 | V1 | V1 | V1 |
| FR, V1 at 1.1 mm, FOT 5 (t1 + t2) | s | 87 | 72.3 | 86 | 65 |
| VX at 1.5 mm, UL94 | | V1 | V1 | V1 | V0 |
| FR, V0 at 1.5 mm, FOT 5 (t1 + t2) | s | 57 | 51 | 60 | 40 |

As evidenced from Table 6, by comparing C2 and Ex4 it was observed that replacing BPADP with PPZ, notched impact strength was significantly improved, especially at lower temperatures. HDT also highly increased (by about 20%). In addition, the FR robustness of the Ex4 composition (a PPZ-based formulation) was improved with a lower burning time.

Comparing C2 with Ex5, it was observed—as expected—that the inclusion of recycled resin (PCR-PC) had a substantially negative effect on Izod impact strength. Even at room temperature, impact strength dropped from 452 J/m to 86 J/m, completely losing ductility. HDT also exhibited a drop of about 3° C.

For PCR-PC and iQ PBT blends, PPZ was used in the Ex6 composition. It was observed that using with PPZ as the FR additive resulted in robustness of notched Izod properties, with both impact strength and HDT being significantly improved as compared to the Ex5 composition. The notched Izod impact robustness of the PCR-PC and iQ PBT blend of Ex6 was increased to same level as Ex4 that did not include PCR-PC.

Additional example compositions and their properties are shown in Table 7:

TABLE 7

| Example Compositions | | | |
|---|---|---|---|
| Item Description | Ex7 | Ex8 | Ex9 |
| 100 GRADE PCP | 7.73 | 7.73 | 4.23 |
| iQ PBT, High Viscosity | 20 | 20 | 15 |
| PC-Siloxane copolymer, 20% siloxane content | 25 | 25 | 20 |
| PCR-PC from car light | 40 | 40 | 55 |
| PPZ | 6 | 5 | 4 |
| BPADP | | | |
| SFR 100 | | 0.5 | 0.5 |
| Irganox® 1010 | 0.15 | 0.15 | 0.15 |
| SAN-encapsulated PTFE | 0.8 | 0.8 | 0.8 |
| 2-(2'Hydroxy-5-T-Octylephenyl)-Benzotriazole | 0.27 | 0.27 | 0.27 |
| MZP | 0.05 | 0.05 | 0.05 |
| MFR at 265° C., 5 kg, 300 s | 27 | 24 | 25 |
| HDT, 0.45 MPa, 3.2 mm | 97 | 99 | 99 |
| HDT, 1.82 MPa, 3.2 mm | 85 | 87 | 88 |
| Notched Izod impact strength, 23° C., average | 898 | 911 | 1140 |
| Notched Izod impact strength, 0° C., average | 799 | 805 | 966 |
| Notched Izod impact strength, −10° C., average | 742 | 774 | 918 |
| Notched Izod impact strength, −20° C., average | 147 | 169 | 186 |
| Flexural modulus | 2360 | 2290 | 2380 |
| Flexural strength at yield | 88.8 | 85.6 | 93.6 |
| VX at 1.1 mm, UL94 | V1 | V1 | V1 |
| FR, V1 at 1.1 mm, FOT 5 (t1 + t2) | 58 | 59.5 | 65 |
| VX at 1.5 mm, UL94 | V0 | V0 | V0 |
| FR, V0 at 1.5 mm, FOT 5 (t1 + t2) | 15 | 25.9 | 23.3 |

Comparing Ex7 having 6 wt % PPZ with Ex5 having 5 wt % PPZ, it is observed that Ex7 had more robust FR performance with a shorter burning time (15 s). However, heat performance of this composition was reduced. Another approach with silicone oil included (Ex8) showed improved FR robustness and higher notched Izod strength. Ex8 also had a slightly higher HDT. Addtionally, as shown in Ex9, with silicone oil as an FR synergist a lower PPZ loading and EXL loading could be used allowing a higher PCR-PC content loading (55 wt %), providing an improved sustainability benefit to the environment.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A thermoplastic composition comprising:

(a) from about 10 wt % to about 65 wt % of a polycarbonate component comprising at least one virgin polycarbonate and from about 25 wt % to about 65 wt % of at least one PCR polycarbonate;

(b) from about 10 wt % to about 40 wt % of a polybutylene terephthalate (PBT) component derived from a post-consumer recycled (PCR) polymer;

(c) from about 10 wt % to about 40 wt % of a polycarbonate-siloxane (PC-Si) copolymer;

(d) from 0.1 wt % to about 10 wt % of a phosphazene flame retardant; and (e) from 0.1 wt % to about 2 wt % of a silicone oil, wherein the composition has (1) a flame retardance of V0 at a thickness of 1.5 mm when determined in accordance with UL94, and (2) a notched Izod impact strength of at least 690 J/m at a temperature of −10° C., as determined in accordance with ASTM D256, and wherein the combined weight percent value of all components does not exceed 100 wt %, and all weight percent values are based on the total weight of the composite.

2. The thermoplastic composition according to claim 1, wherein the PBT component is derived from PCR polyethylene terephthalate (PET).

3. The thermoplastic composition according to claim 1, wherein the PC-Si copolymer has a siloxane content of from about 5 wt % to about 45 wt %.

4. The thermoplastic composition according to claim 1, wherein the PC-Si copolymer has a siloxane content of from about 15 wt % to about 25 wt %.

5. The thermoplastic composition according to claim 1, wherein the PC-Si copolymer has a siloxane content of about 20 wt %.

6. The thermoplastic composition according to claim 1, wherein the composition further comprises from greater than 0 wt % to about 2 wt % of an anti-drip agent, wherein the anti-drip agent comprises styrene acrylonitrile (SAN)-encapsulated polytetrafluoroethylene (PTFE).

7. The thermoplastic composition according to claim 1, wherein the composition further comprises from greater than 0 wt % to about 2 wt % of an epoxy impact modifier.

8. The thermoplastic composition according to claim 7, wherein the epoxy impact modifier comprises a terpolymer comprising ethylene, acrylic ester and glycidyl methacrylate.

9. The thermoplastic composition according to claim 1, wherein the composition further comprises from greater than 0 wt % to about 5 wt % of at least one stabilizer, wherein the at least one stabilizer comprises a UV stabilizer, a zinc phosphate stabilizer, or a combination thereof.

10. The thermoplastic composition according to claim 1, wherein the at least one PCR polycarbonate comprises at least 10 mol % —OH endgroup content.

11. The thermoplastic composition according to claim 10, wherein the at least one PCR polycarbonate comprises from 10 mol % to about 35 mol % —OH endgroup content.

12. The thermoplastic composition according to claim 1, wherein the composition has (1) a flame retardance of V0 at a thickness of at least 1.5 mm, and (2) a heat distortion temperature of at least 85° C. as determined in accordance with ASTM D648 at 1.82 MPa for samples having a thickness of 3.2 mm.

13. An article comprising the composition according to claim 1, wherein the article is a component of a consumer electronics product.

14. The thermoplastic composition according to claim 1, wherein the PBT component of element (b) comprises poly(1,4-butylene terephthalate) homopolymer.

15. The thermoplastic composition according to claim 1, wherein the PBT component of element (b) comprises a PBT homopolymer.

* * * * *